(12) United States Patent
Hamrelius et al.

(10) Patent No.: US 7,157,705 B2
(45) Date of Patent: Jan. 2, 2007

(54) HANDHELD INFRARED CAMERA

(75) Inventors: Torbjörn Hamrelius, Sollentuna (SE);
Tomas Lannestedt, Alvsjo (SE)

(73) Assignee: FLIR Systems AB, Danderyd (SE)

( * ) Notice: Subject to any disclaimer, the term of this patent is extended or adjusted under 35 U.S.C. 154(b) by 188 days.

(21) Appl. No.: 10/476,760

(22) PCT Filed: May 7, 2001

(86) PCT No.: PCT/SE01/00984

§ 371 (c)(1),
(2), (4) Date: Nov. 5, 2003

(87) PCT Pub. No.: WO02/090911

PCT Pub. Date: Nov. 14, 2002

(65) Prior Publication Data
US 2004/0129881 A1 Jul. 8, 2004

(51) Int. Cl.
*G01J 5/02* (2006.01)
(52) U.S. Cl. ..................... 250/330; 250/353
(58) Field of Classification Search ............... 250/330, 250/353, 332, 334, 358.1; 600/549, 474, 600/413; D10/57, 2; D16/206
See application file for complete search history.

(56) References Cited

U.S. PATENT DOCUMENTS

| 424,081 | A | * | 3/1890 | Gordon et al. ........... 411/451.3 |
| 3,752,983 | A | | 8/1973 | Yanez |
| 4,005,605 | A | * | 2/1977 | Michael ...................... 374/129 |
| 4,634,294 | A | | 1/1987 | Christol et al. |
| D317,414 | S | | 6/1991 | Lanci et al. |
| D321,487 | S | * | 11/1991 | Manno ........................ D10/57 |
| 5,159,198 | A | | 10/1992 | Kohsaka et al. |
| 5,352,039 | A | * | 10/1994 | Barral et al. ................. 374/121 |
| 5,422,484 | A | * | 6/1995 | Brogi et al. ............ 250/339.15 |
| 5,637,871 | A | * | 6/1997 | Piety et al. .................. 250/330 |
| 5,675,149 | A | | 10/1997 | Wood et al. |
| 5,845,165 | A | | 12/1998 | McMahan |
| 6,319,199 | B1 | | 11/2001 | Sheehan et al. |
| 6,440,084 | B1 | * | 8/2002 | Gentempo et al. .......... 600/549 |
| D464,666 | S | | 10/2002 | Salapow et al. |

(Continued)

FOREIGN PATENT DOCUMENTS

WO   WO 98/02085   1/1998

(Continued)

OTHER PUBLICATIONS

Guide D'Achat, Measures Physiques, "Les pyrometres infrerouge sans contact", Measures 706, Jun. 1998, pp. 88-96.

(Continued)

*Primary Examiner*—David Porta
*Assistant Examiner*—Faye Polyzos
(74) *Attorney, Agent, or Firm*—Young & Thompson

(57) ABSTRACT

A handheld infrared camera having a lens assembly, an electric energy source and a handling elements for recording and handling information received via the lens assembly has an essentially elongate housing. The lens assembly is mounted at one end of the housing, the other end portion of which is formed as a user handle, the longitudinal axis of which preferably is inclined relative to the optical axis of the lens assembly to form an angle (αalpha) with the optical axis. There are provided manual control elements for allowing single hand operation of the camera, and a visual control elements is intended to be viewed when holding and operating the camera away from the eye and the body of a user. The camera is advantageously provided with elements for wireless transmission of information from the camera.

20 Claims, 2 Drawing Sheets

U.S. PATENT DOCUMENTS

| | | | | |
|---|---|---|---|---|
| 6,486,473 | B1 * | 11/2002 | Salapow et al. | 250/330 |
| D466,540 | S * | 12/2002 | Lannestedt et al. | D16/218 |
| D481,053 | S * | 10/2003 | Colburn et al. | D16/206 |
| D482,712 | S * | 11/2003 | Hsu | D16/202 |
| D493,733 | S * | 8/2004 | Chen | D10/57 |
| 6,781,127 | B1 * | 8/2004 | Wolff et al. | 250/332 |
| 6,787,775 | B1 * | 9/2004 | Bielefeld et al. | 250/330 |
| 2001/0043273 | A1 * | 11/2001 | Herrod et al. | 348/220 |
| 2002/0057365 | A1 * | 5/2002 | Brown | 348/552 |
| 2002/0162963 | A1 * | 11/2002 | Lannestedt et al. | 250/351 |
| 2004/0122602 | A1 * | 6/2004 | Nagase | 702/51 |
| 2005/0007777 | A1 * | 1/2005 | Klipstein et al. | 362/244 |
| 2005/0018044 | A1 * | 1/2005 | Brown | 348/143 |
| 2005/0024495 | A1 * | 2/2005 | Hemrelius et al. | 348/149 |
| 2005/0156111 | A1 * | 7/2005 | Racca et al. | 250/338.5 |

FOREIGN PATENT DOCUMENTS

WO    WO 00/30526    6/2000

OTHER PUBLICATIONS

XI'an Jiang Yang, Electric Power, 1998, three pages.
Website printout www.reytek.com, one page.

* cited by examiner

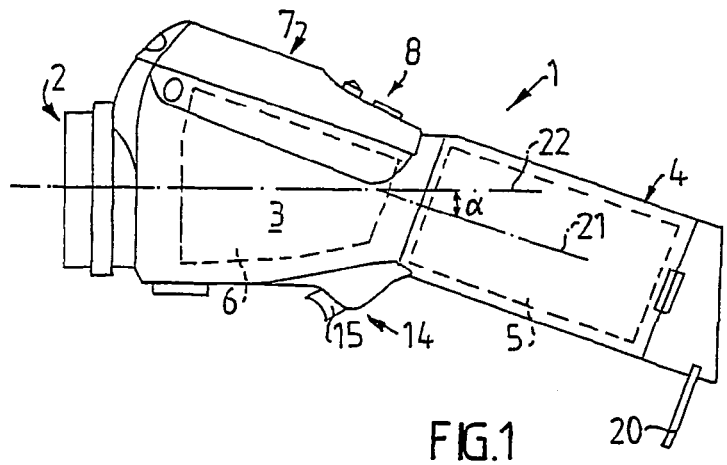
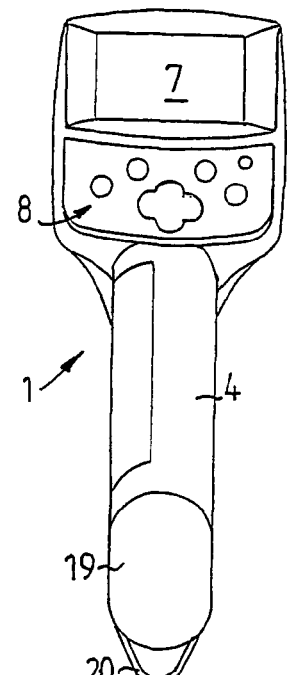
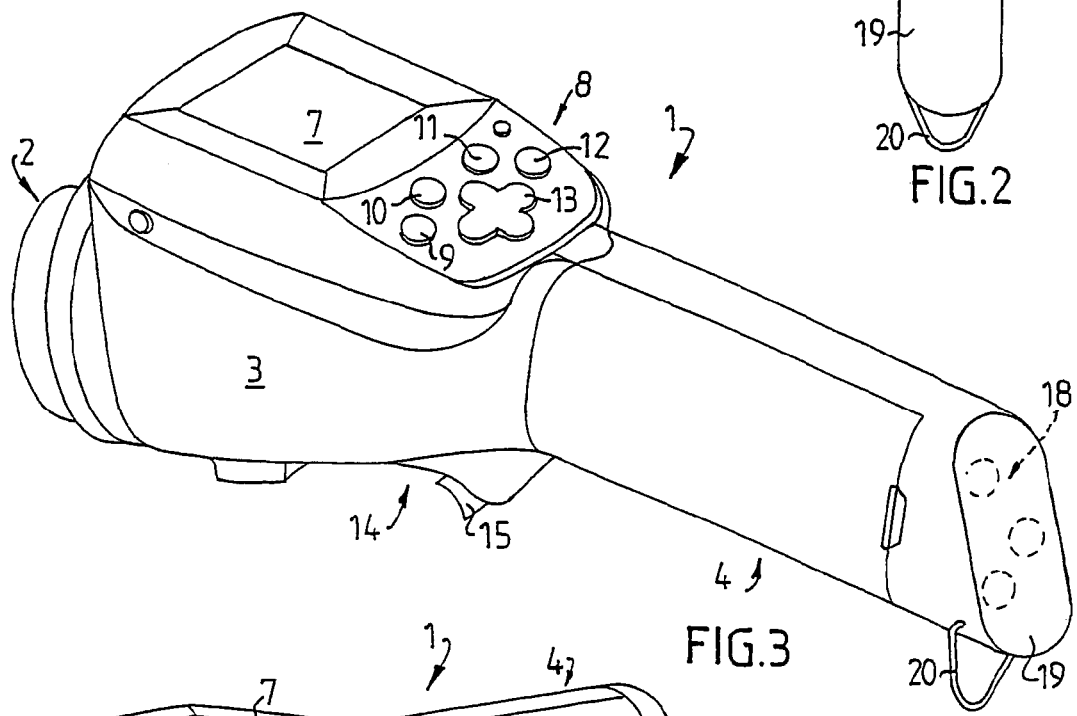
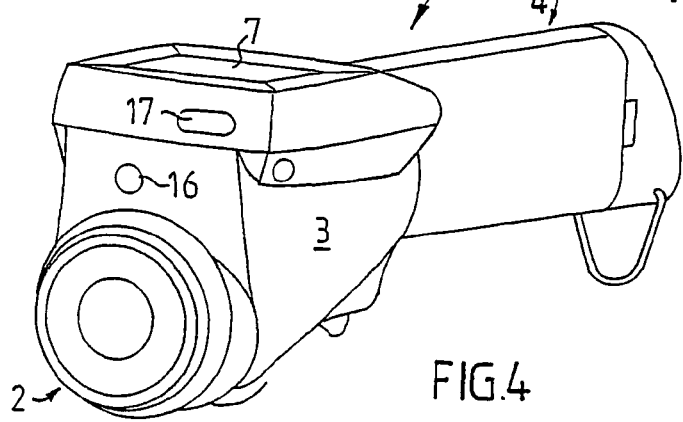

ial energy source 5, suitably in the form of a rechar-

HANDHELD INFRARED CAMERA

TECHNICAL FIELD

The present invention relates to a handheld infrared camera.

BACKGROUND OF THE INVENTION

It is becoming more and more common to use various kinds of special non-contact equipment for controlling the local temperature of various items in order to find out the status of the item. It is for instance well known to look for heat leaks by means of non-contact infrared equipment in order to be able to perform the control at a certain distance from the object. Also, spot pyrometers (non-contact thermometers) are used in a number of applications like food safety, car manufacturing and repair, inspection of aircraft, etc. When using a spot pyrometer, however, the operator is running the risk of missing the desired target or the critical hot spot since he has no other way to perform the control than by manually scanning the object by pointing his spot pyrometer in different directions in an effort to find the actual hot spot. This is sometimes a cumbersome and time-consuming procedure and is not an efficient way to find the actual hot spot. There is thus a risk that the use of a spot pyrometer might not produce a safe result.

The use of an infrared camera allows a safer detection of hot spots. A problem is, however, that normal IR-cameras are rather heavy optical instruments that require careful and gentle handling by two hands. They are often designed like a normal video camera with a normal view finder or an LCD display on a rotating joint. Such equipment is rather fragile and is not well suited for use in harsh environments where service technicians often have to perform their duties.

In many applications a service technician would need an IR-camera, that is easy to handle and that is easy to use in awkward positions. It is also often desirable to have rugged equipment that can stand fairly rough treatment and is easy to bring along in different situations.

THE OBJECT OF THE INVENTION

It is an object of the invention to provide an infrared camera that has good portability and that is easy to operate, preferably with the use of a single hand.

A further object of the invention is to provide an infrared camera that can stand fairly rough treatment, for use in different and sometimes difficult environments.

A still further object of the invention is to provide an infrared camera that is dependable and versatile, at a reasonable cost.

SUMMARY OF THE INVENTION

The objects of the invention are achieved by means of an infrared camera having the features of claim 1.

According to the invention an infrared camera is obtained where the housing is essentially elongate and has the lens assembly mounted at one end while the opposite end is formed as a user handle. On the housing there are provided manual control means for thumb operation by the user, and also a visual control means to be viewed at a distance. This allows easy holding and operating of the camera by one hand, away from the eyes and the body of the user. The inventive camera could advantageously be used for thermographic inspections in various kinds of environments.

The elongate shape of the housing of the camera, providing a good grip and having no protruding, fragile parts, provides good portability and also helps to provide a rugged design.

Also, the easy to operate design helps to provide good results from the use of the camera, since a serviceman using it can concentrate more on the actual problem to be solved, rather than to have to struggle with the operation of the camera.

Further details and advantages of the invention will become apparent from the following description and the appended claims.

BRIEF DESCRIPTION OF THE DRAWINGS

FIG. 1 shows a side view of a camera according to the invention,

FIG. 2 shows a rear perspective view of the FIG. 1 camera,

FIG. 3 shows a side perspective view of the FIG. 1 camera,

FIG. 4 shows a front perspective view of the FIG. 1 camera,

DETAILED DESCRIPTION

Figure 5:
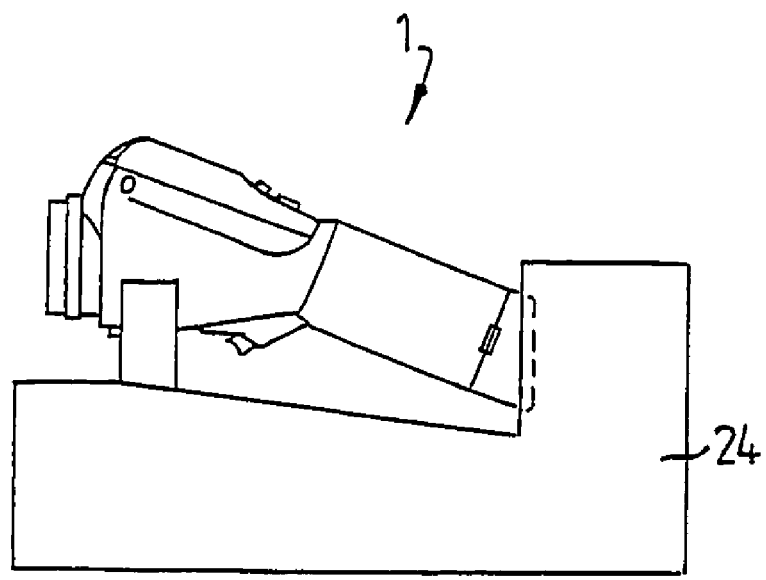
FIG. 5 shows the camera in a docking station.

In FIGS. 1–4 there is shown an infrared camera 1 according to the invention. There is provided a lens assembly 2, which could be exchangeable and which is secured to one end of an essentially elongate housing 3, the opposite end portion 4 of which is formed as a user handle. Inside the housing 3, in the handle portion 4, there is provided an electrical energy source 5, suitably in the form of a rechargable battery, but also other options would obviuosly be possible. Inside the housing 3 there is also provided a handling unit 6 for receiving and handling information received via the lens assembly 2.

On the forward portion of the housing 3, ahead of the handle portion 4, there is provided a user interface arrangement for operating the camera 1. Said interface arrangement is intended to provide easy and quick control and operation of the camera visually and by only one hand. There is thus provided a display 7, which is located up front on the top side of the forward portion of the housing 3, and manual control means located ahead of the handle portion 4. Included in the manual control means there is a first set 8 of control means intended to be operated by the thumb of the user and located between the display 7 and the handle portion 4. In the embodiment shown here this first set 8 comprises four push buttons 9–12 and a joystick button 13, which can be tilted in several directions. The push buttons 9–12 are preferably located on a circular arc, the radius of which is intended to essentially correspond to the radius of movement for the thumb of a user holding the handle portion 4. Instead of push buttons other kinds of manual control means could of course be used. Also, the arrangement and number of manual control means could be different.

Included in the manual control means there is also a second set 14 of control means intended to be operated by the forefinger of the user and located on the lower side of the forward portion of the housing 3, essentially opposite said first set 8. In this particular embodiment the second set 14 comprises a trigger 15, which is used to activate and deactivate various functions of the camera 1. Other embodiments are of course also possible, dependending on the desired layout and the intended functions of the camera. As an example a laser, having a window 16 (FIG. 4) at the front of the housing 3 and intended to assist in aiming the camera 1 at a desired target, could be activated and deactivated by means of the trigger 15.

In certain situations it could be desirable to send measurement results or pictures to a control center while still being out on a mission. To this end there could be included in the camera 1 a device for wireless communication, such as an IRDA link or a similar arrangement, having a communication window 17, preferably at the front of the housing 3 (FIG. 4). Also, Bluetooth technology, or a similar technology, might be used. The same equipment could be used to transfer IR images or other information to computers either directly or via mobile phones, when desired. Included in the camera there could also be an acoustic alarm device (not shown) that could be set to provide an audible alarm when finding or pointing at a target or target area where a critical temperature is not within a predetermined safe range. In this way the operator can be made aware of a critical situation both visually and acoustically.

As shown in FIG. 3 there could be provided at the rear end of the handle portion 4, or at some other location, a set 18 of connectors, accessible via a closure 19, for docking the camera to a docking station 24, as shown in FIG. 5, in order to have the handling unit 6 communicate with a base station for various purposes, and for charging the battery.

On the handle portion 4 there could be provided a holder 20 by means of which the camera 1 for instance could be hung on the belt of an operator when not in use.

As seen in FIG. 1 the handle portion 4 has a longitudinal axis 21 and the lens assembly 2 has an optical axis 22. These two axis could be parallel to each other or, as shown, form an angle α relative to each other, the maximum value of the angle α being 90°. The angle α preferably has a value less than 45°. Favourably the angle α is within the range 15–30° and could to advantage be about 20°, essentially as shown on the drawing.

Figure 6:
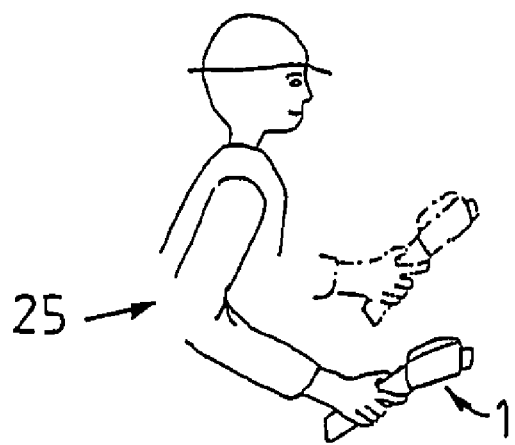
FIG. 6 shows schematically the camera of FIG. 1 in use by a user.

This embodiment makes it possible to hold the camera 1 by either hand, as shown schematically in FIG. 6, and point it towards a target while holding the hand at a restful low position, shown with full lines, and having a good and easy view of the display 7. In order to facilitate viewing of the the display 7 for an operator 25 when holding the camera in different positions it is preferable to have the display located as far forward on the camera as possible. This helps reducing the need for the user to bend his neck in order to obtain a good view. With his thumb and forefinger an operator 25 can then select desired functions by activating adequate buttons in order to make selections in menus made available on the display 7 via the handling unit 6. By means of the trigger 15 the laser included in the camera could be activated in order to make it easier to aim the camera at a desired target. Once on target, the trigger 15 could then be used to save a special picture. The camera could be activated and deactivated by means of a thumb operated button. If desired, results and images can be temporarily stored, for deloading at a convenient later time. The camera 1 can easily be given a good balance, especially by locating the energy source 5 in the handle portion 4 in order to make it even more restful to hold. This also helps to make operation easy when it is desirable to check targets that when using traditional equipment would be difficult to get at and also make the operator tired.

By making the housing 3 sturdy and making it shock proof, preferably by providing it with rubber padding, and by making the display 7, possibly of the LCD type, well protected at the same time that the manual operating means are made distinct and easy to operate, a highly transportable and convenient to use camera is obtained that could be used within various fields.

The inventive camera is, as indicated, primarily intended as an infrared camera for thermographic inspections. In an advantageous embodiment the camera can designed for also measuring temperatures and thus be a radiometric camera. Also other applications would, however, within the scope of the invention, be possible after proper modification.

We claim:

1. A handheld infrared camera, for thermal imaging comprising:
   a lens assembly (2) supported by a housing (3), said housing being arranged to hold an electric energy source (5) and a handling thermal imaging means (6) for recording and handling information received via the lens assembly,
   said housing (3) being provided with user control means for visual and manual control of the apparatus, said housing (3) being essentially elongate, having the lens assembly (2) mounted at one end portion and having the opposite end portion formed as a user handle (4), there being provided on one side of the housing a set (8) of manual control means intended to be operated via the thumb of the user, and also a visual control means (7) located between said set (8) of manual control means and the lens assembly (2) and being adapted to be viewed when holding the camera away from the eye and the body of a user,
   said camera being arranged for single hand operation.

2. A camera according to claim 1, wherein a longitudinal axis (21) of the user handle (4) forms an angle (α) with an optical axis (22) of the lens assembly (2), said angle being within the range 0–45°.

3. A camera according to claim 1, wherein the set (8) of manual control means comprises a joystick button (13) and a set of push buttons (9–12) spread out on a circular arc, the center of which is intended to essentially coincide with the location of the inner joint of the thumb of a user gripping the handle portion (4).

4. A camera according to claim 3, wherein the set (8) of manual control means is adapted to control the handling unit (6), for selecting and controlling an operating mode of the camera.

5. A camera according to claim 3, wherein there are four of said push buttons (9–12) included in the set of buttons, two of said push buttons to each side of the joystick button (13).

6. A camera according to claim 1, wherein the electrical energy source (5) is located in the handle portion (4) for providing a good balance of the camera.

7. A camera according to claim 1, wherein at the free end of the handle portion (4) there are provided electrical connectors (18) for contact with corresponding electrical connectors in a docking station, said contacts being protected by an openable closure (19).

8. A camera according to claim 1, further comprising an alarm device adapted to give an acoustic signal when the value of a controlled parameter falls outside a predetermined range.

9. A camera according to claim 1, further comprising a laser in the camera for facilitating aiming of the camera, said laser being adapted to be activated and deactivated by control means.

10. A camera according to claim 1, further comprising a trigger means (15) on said housing intended to be operated by the forefinger of a user holding the camera, for controlling and selecting functions to be performed by the camera.

11. A camera according to claim 10, wherein the trigger means (15) is intended to activate and deactivate the laser, and to initiate saving of information relating to an object at which the camera is pointed.

12. A camera according to claim 1, further comprising means for wireless transmission of information from the camera.

13. A camera according to claim 1, wherein the lens assembly (2) is interchangeable.

14. A camera according to claim 1, further comprising a holder (20) on said housing for hanging the camera.

15. A camera according to claim 1, wherein the housing (3) is sturdy and shock proof.

16. The camera of claim 1, wherein said visual control means (7) comprises a display screen on a top of said housing in a plane parallel to a longitudinal axis of said handle.

17. The camera of claim 1, wherein a bottom of said housing at said one end portion is parallel to an optic axis of said lens assembly and the bottom of said housing at said opposite end portion is parallel to a longitudinal axis of said handle, said optic and longitudinal axes intersecting at an angle of 15–45°, and further comprising a second manual control device on the bottom of said housing where said bottom transitions from parallel to said longitudinal axis to parallel to said optic axis.

18. A handheld infrared camera for thermal imaging, comprising: a lens assembly (2) supported by a housing (3), said housing being arranged to hold an electric energy source (5) and a handling means (6) for recording and handling thermal imaging information received via the lens assembly, said housing (3) being provided with user control means for visual and manual control of the apparatus, said housing (3) being essentially elongate, having the lens assembly (2) mounted at one end portion and having the opposite end portion formed as a user handle (4), there being provided on one side of the housing a set (8) of manual control means intended to be operated via the thumb of the user, and also a visual control means (7) located between said set (8) of manual control means and the lens assembly (2) and being adapted to be viewed when holding the camera away from the eye and the body of a user, said camera being arranged for single hand operation, wherein a longitudinal axis (21) of the user handle (4) forms an angle (cx) with an optical axis (22) of the lens assembly (2), said angle being within the range 15–30°.

19. A handheld infrared camera for thermal imaging, comprising:
an elongate housing having at one distal end a handle that is arranged to hold an energy source and at an opposite distal end a lens assembly for receiving thermal imaging information, said lens assembly having an optic axis and said handle having a longitudinal axis that intersects said optic axis at an angle of 15–45°, said housing having a top that is parallel to said longitudinal axis from said one end to said opposite end and a bottom that is parallel to said longitudinal axis at said one end and parallel to said optic axis at said opposite end, said housing carrying thermal imaging circuitry for recording and handling thermal imaging information received at said lens assembly, said housing being adapted to be held by a user with one hand;

a display screen on said top of said housing at said opposite end adjacent to said lens assembly, said display screen being in a plane that is parallel to said longitudinal axis of said handle; and first and second controls for manual control of the camera, said first controls being on said top of said housing between said display screen and said handle, said second controls being on said bottom of said housing where said bottom transitions from parallel to said longitudinal axis to parallel to said optic axis, said first controls being arranged to be operated with a thumb of a user holding said handle and said second controls being arranged to be operated with a forefinger of a user holding said handle, said first controls including plural buttons around a central joystick and said second controls including a trigger.

20. The camera of claim 19, wherein said angle is 15–30°.

* * * * *